(12) United States Patent
Ballas (10) Patent No.: US 10,005,141 B2
(45) Date of Patent: Jun. 26, 2018

(54) TOOL HOLDER HAVING INSERT RECEIVING POCKET WITH STRESS RELIEF SURFACES

(71) Applicant: Iscar, Ltd., Tefen (IL)

(72) Inventor: Assaf Ballas, Akko (IL)

(73) Assignee: Iscar, Ltd., Tefen (IL)

( * ) Notice: Subject to any disclaimer, the term of this patent is extended or adjusted under 35 U.S.C. 154(b) by 210 days.

(21) Appl. No.: 15/228,407

(22) Filed: Aug. 4, 2016

(65) Prior Publication Data

US 2018/0036808 A1  Feb. 8, 2018

(51) Int. Cl.
    B23C 5/10      (2006.01)
    B23C 5/22      (2006.01)
    B23C 5/06      (2006.01)
    B23P 15/34     (2006.01)

(52) U.S. Cl.
    CPC .............. *B23C 5/06* (2013.01); *B23C 5/2208* (2013.01); *B23P 15/34* (2013.01); *B23C 2210/168* (2013.01)

(58) Field of Classification Search
    CPC ....... B23C 2210/242; B23C 5/14; B23C 3/12; B23C 5/003; B23C 5/109; B23C 5/006; B23C 2210/168; B23C 2210/165
    See application file for complete search history.

(56) References Cited

U.S. PATENT DOCUMENTS

| | | | | |
|---|---|---|---|---|
| 3,059,316 A | * | 10/1962 | Berry, Jr. | B23B 27/16 407/101 |
| 6,071,045 A | | 6/2000 | Janness | |
| 6,929,427 B2 | | 8/2005 | Satran | |
| 7,578,641 B2 | * | 8/2009 | Andersson | B23C 5/2208 407/103 |
| 8,506,208 B2 | * | 8/2013 | Engstrom | B23C 5/06 407/101 |
| 2006/0260439 A1 | * | 11/2006 | Tubinger | B23B 51/04 76/108.6 |
| 2007/0248425 A1 | * | 10/2007 | Andersson | B23C 5/06 407/113 |

(Continued)

FOREIGN PATENT DOCUMENTS

JP    07251302 A  * 10/1995
JP    5962941 B2     8/2016

OTHER PUBLICATIONS

International Search Report dated Oct. 26, 2017, issued in PCT counterpart application (No. PCT/IL2017/050751).

(Continued)

*Primary Examiner* — Sara Addisu
(74) *Attorney, Agent, or Firm* — Womble Bond Dickinson (US) LLP (57) ABSTRACT

A tool holder has a tool body with at least one pocket for receiving at least one cutting insert. The at least one pocket has a support surface and an abutment surface transverse thereto, and a first stress relief surface located between the support surface and the abutment surface. The first stress relief surface extends along a first axis towards a first pocket peripheral surface. A second stress relief surface is formed between the first stress relief surface and the first pocket peripheral surface. The second stress relief surface has a convex shape in a cross-sectional view taken in a second plane containing the first axis. The convex shape may have a radius greater than 0.3 mm.

20 Claims, 8 Drawing Sheets

(56) References Cited

U.S. PATENT DOCUMENTS

| | | | | |
|---|---|---|---|---|
| 2007/0280790 | A1* | 12/2007 | Kovac | B23B 27/1662 407/30 |
| 2008/0304924 | A1* | 12/2008 | Engstrom | B23C 5/202 407/114 |
| 2008/0304928 | A1* | 12/2008 | Engstrom | B23C 5/2247 408/229 |
| 2009/0169313 | A1* | 7/2009 | Satran | B23C 5/109 407/40 |
| 2011/0076106 | A1* | 3/2011 | Morrison | B23C 5/1045 407/102 |
| 2012/0251250 | A1* | 10/2012 | Morrison | B23C 5/2221 407/42 |
| 2013/0129429 | A1* | 5/2013 | Filho | B23C 5/28 407/11 |
| 2013/0129431 | A1* | 5/2013 | Filho | B23C 5/109 407/40 |
| 2013/0336734 | A1* | 12/2013 | Morgulis | B23B 27/065 407/102 |
| 2014/0086696 | A1* | 3/2014 | Fang | B23C 5/2221 407/99 |
| 2014/0219733 | A1* | 8/2014 | Roman | B23C 5/06 407/40 |
| 2014/0369773 | A1* | 12/2014 | Waggle | B23C 5/003 407/54 |
| 2015/0336187 | A1* | 11/2015 | Choi | B23C 5/06 407/48 |
| 2016/0031020 | A1* | 2/2016 | Francis | B23C 5/109 407/42 |
| 2017/0080503 | A1 | 3/2017 | Koike et al. | |

OTHER PUBLICATIONS

Written Opinion dated Oct. 26, 2017, issued in PCT counterpart application (No. PCT/IL2017/050751).

* cited by examiner

TOOL HOLDER HAVING INSERT RECEIVING POCKET WITH STRESS RELIEF SURFACES

FIELD OF THE INVENTION

The present invention relates to tool holders having insert receiving pockets for use in metal cutting processes in general, and for rotary machining operations in particular.

BACKGROUND OF THE INVENTION

Within the field of cutting tools used in rotary machining operations, there are many examples of tool holders having insert receiving pockets with stress relief surfaces. Stress relief surfaces are typically located between a support surface and an abutment surface of the insert receiving pocket to reduce the tensile and compressive stresses exerted on the tool holder, via a removably secured cutting insert, during machining operations.

Reference can be made to FIGS. 8 to 10 of U.S. Pat. No. 6,929,427 and FIGS. 1 and 7 of U.S. Pat. No. 8,506,208 for prior art examples of tool holders having insert receiving pockets with stress relief surfaces.

Finite element analysis (FEA) of the tensile stresses exerted on insert receiving pockets having stress relief surfaces, has shown that peak stress values occur at or adjacent the corner intersection of the stress relief surfaces and adjacent pocket peripheral surfaces, and this also applies for insert receiving pockets configured with corner intersection surfaces having a chamfer or a concave shape when viewed in cross-section.

Figure 1:
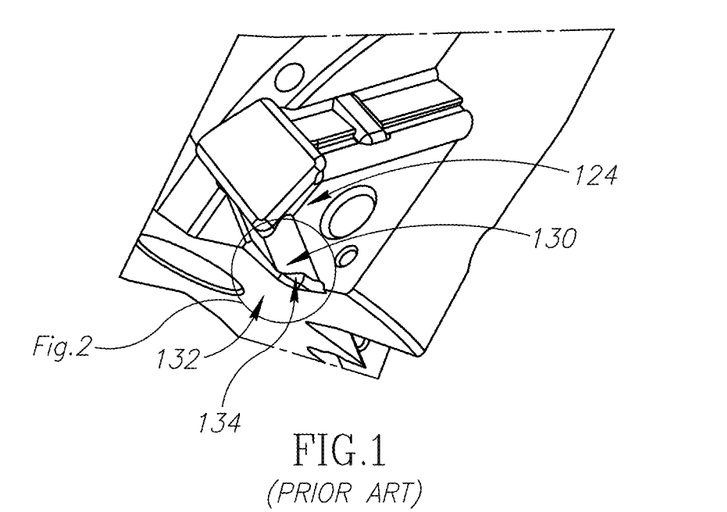
FIG. 1 is a perspective view of an insert receiving pocket according to the prior art.
Figure 2:
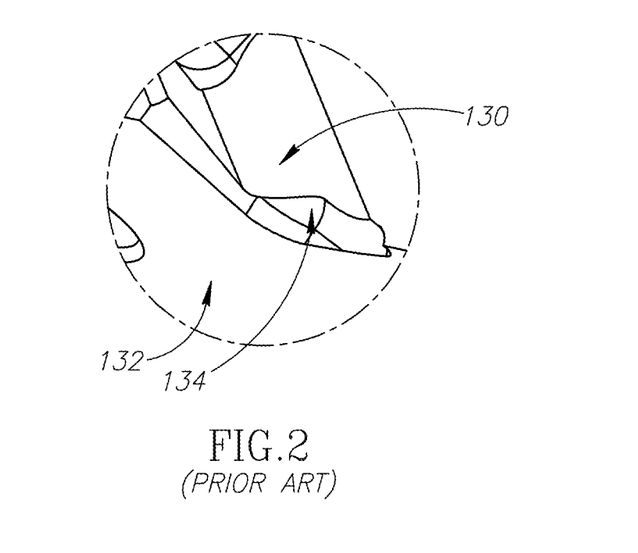
FIG. 2 is a detailed perspective view of a portion of the insert receiving pocket shown in FIG. 1.
Figure 3:
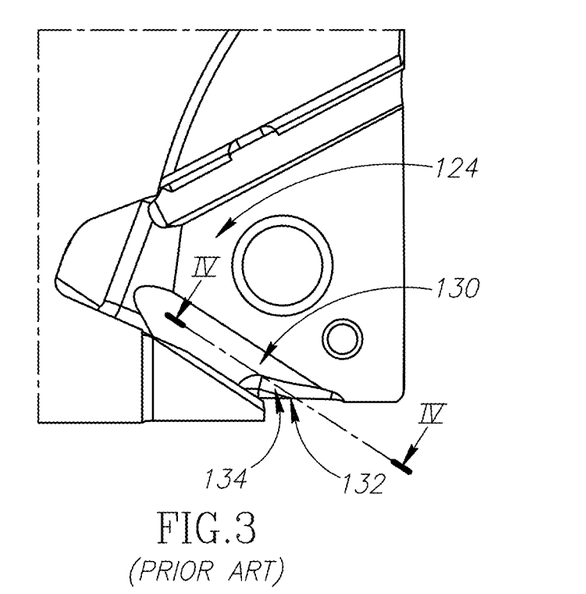
FIG. 3 is a front view of the insert receiving pocket shown in FIG. 1.
Figure 4:
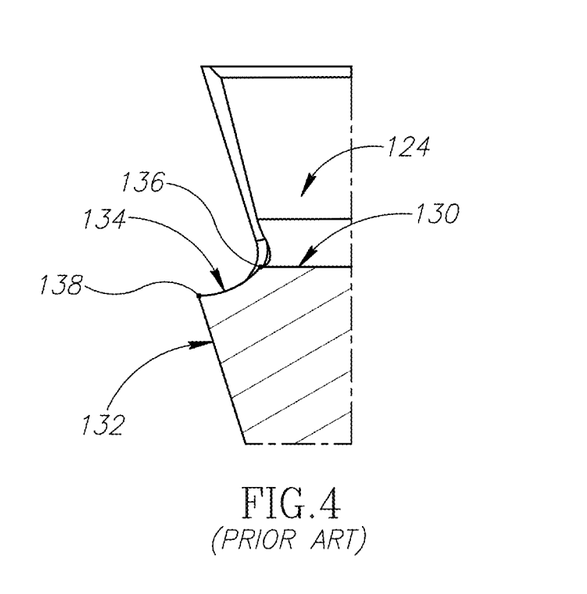
FIG. 4 is a detailed cross-sectional view of the insert receiving pocket shown in FIG. 3, taken along the lines IV-IV.

FIGS. 1 to 3 show an insert receiving pocket 124 according to the prior art, configured with a corner intersection surface 134, between a first stress relief surface 130 and an adjacent pocket peripheral surface 132. As seen in FIG. 4, the corner intersection surface 134, which essentially serves as a second relief surface, has a concave shape when viewed in cross-section.

As also seen in FIG. 4, in cross-section, the corner intersection surface 134 extends between a first endpoint 136 and a second endpoint 138. At its first endpoint 136 the corner intersection surface 134 forms a first discontinuity with the adjoining first stress relief surface 130, and at its second endpoint 138 the corner intersection surface 134 forms a second discontinuity with the adjoining pocket peripheral surface 132.

Figure 5:
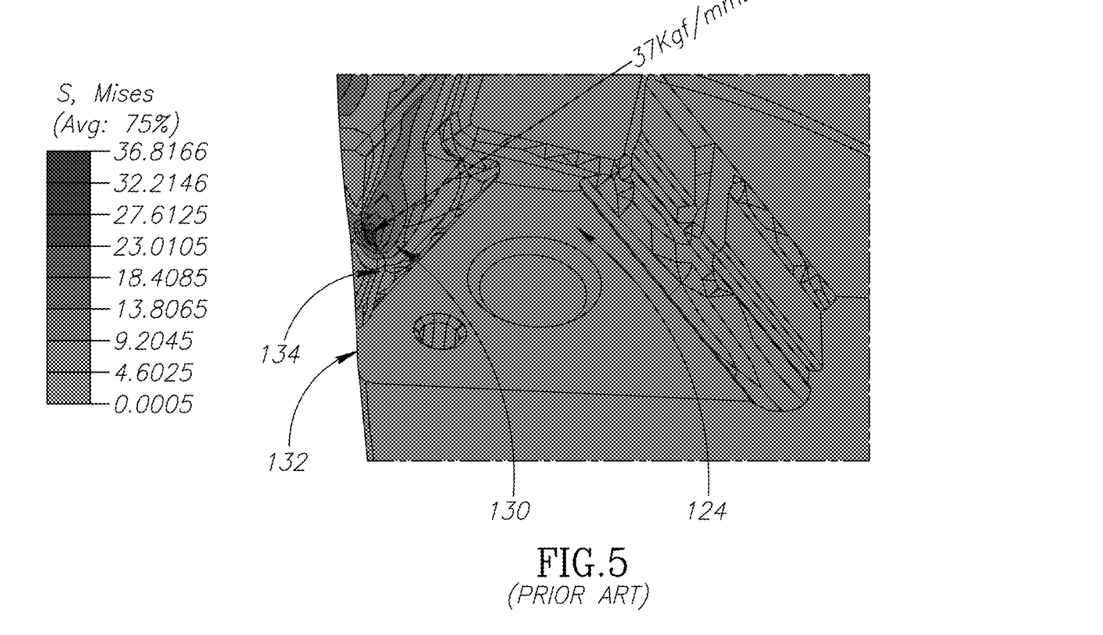
FIG. 5 is a finite element analysis diagram of the insert receiving pocket shown in FIG. 1.

FIG. 5 is an FEA diagram showing the tensile stresses exerted on the insert receiving pocket 124, via a removably secured cutting insert (not shown), during cutting operations, with a peak tensile stress value of 37 Kgf/mm$^2$ occurring immediately adjacent the corner intersection surface 134.

SUMMARY OF THE INVENTION

In accordance with the present invention, there is provided a tool holder comprising a tool body having at least one pocket for receiving at least one cutting insert, the at least one pocket comprising a support surface and an abutment surface transverse thereto, and a first stress relief surface located between the support surface and the abutment surface, the first stress relief surface extending along a first axis towards a pocket peripheral surface, wherein a second stress relief surface is formed between the first stress relief surface and the pocket peripheral surface, and wherein the second stress relief surface has a convex shape in a cross-sectional view taken in a first plane containing the first axis.

Also in accordance with the present invention, there is provided a method of manufacturing the tool holder described above, wherein the second stress relief surface is formed by non-abrasive machining.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 6:
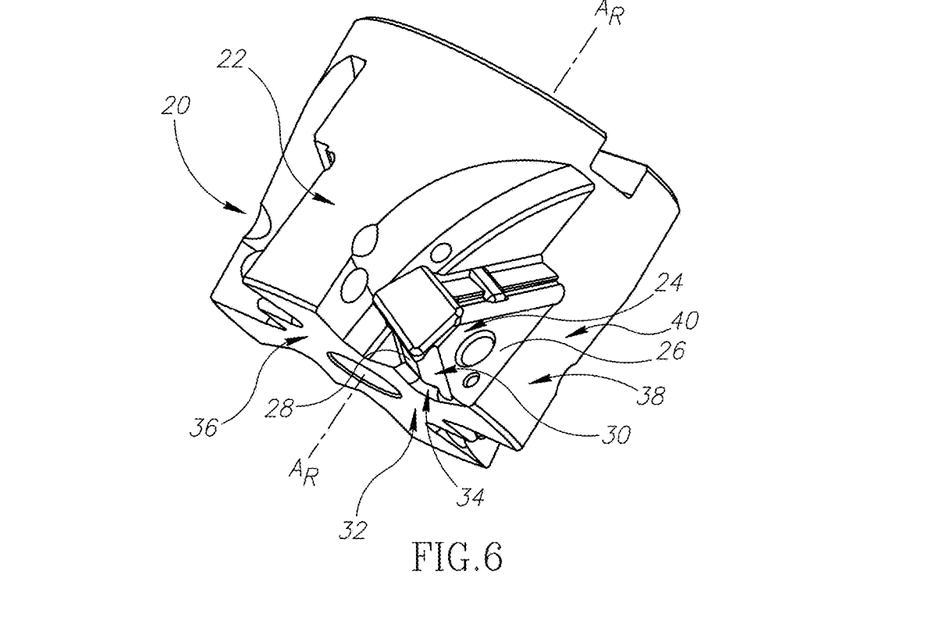
FIG. 6 is a perspective view of a tool holder in accordance with some embodiments of the present invention.

As shown in FIG. 6, the present invention relates to a tool holder 20 comprising a tool body 22 having at least one pocket 24 for receiving at least one cutting insert (not shown).

In some embodiments of the present invention, the tool body 22 may be manufactured from machined steel.

Also in some embodiments of the present invention, the at least one cutting insert may be removably secured in its associated pocket 24.

According to the present invention, as shown in FIGS. 7 to 10, the at least one pocket 24 has a support surface 26 and an abutment surface 28 transverse thereto, and a first stress relief surface 30 located between the support surface 26 and the abutment surface 28.

In some embodiments of the present invention, the first stress relief surface 30 may intersect the support surface 26 and the abutment surface 28.

Also in some embodiments of the present invention the tool body 22 may have a plurality of pockets 24.

As shown in FIG. 6, the tool body 22 may have an axis of rotation $A_R$, and the tool holder 20 may be used in rotary machining operations, for example, milling operations.

According to the present invention, as shown in FIGS. 7 to 10, the first stress relief surface 30 extends along a first axis A1 towards a first pocket peripheral surface 32. A second stress relief surface 34 is formed between the first stress relief surface 30 and the first pocket peripheral surface 32. The second stress relief surface 34 may adjoin both the first stress relief surface 30 and the first pocket peripheral surface 32.

In some embodiments of the present invention, the support surface 26 and the abutment surface 28 may intersect the first pocket peripheral surface 32.

Also in some embodiments of the present invention, the abutment surface 28 may be planar, and the first axis A1 may be parallel to the abutment surface 28.

Figure 7:
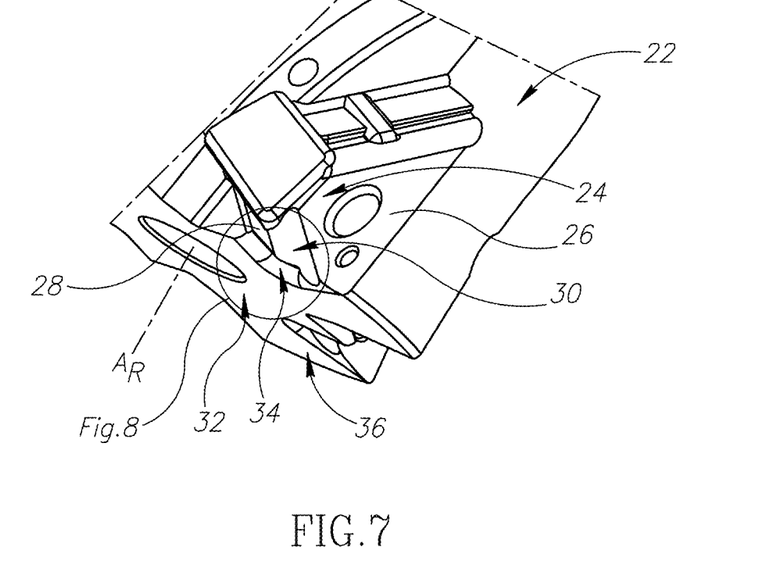
FIG. 7 is a perspective view of an insert receiving pocket of the tool holder shown in FIG. 6.
Figure 8:
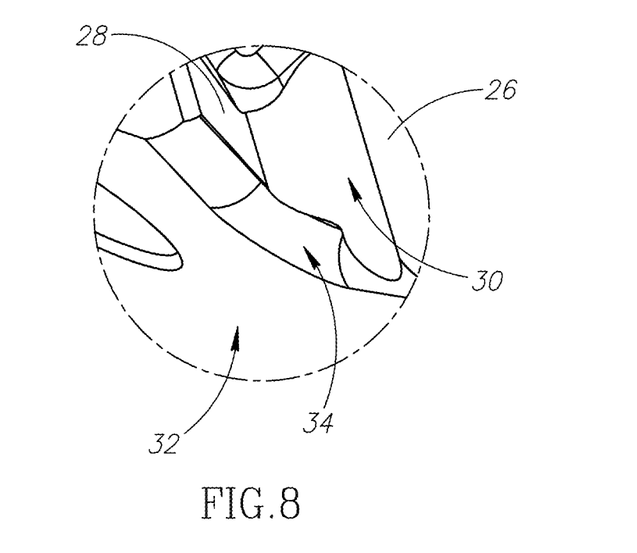
FIG. 8 is a detailed perspective view of a portion of the insert receiving pocket shown in FIG. 7.
Figure 9:
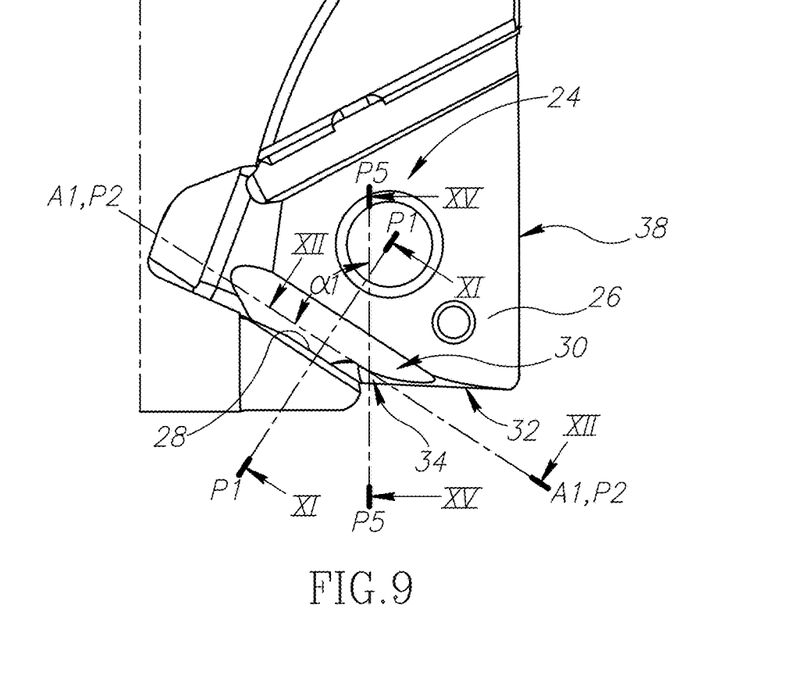
FIG. 9 is a front view of the insert receiving pocket shown in FIG. 7.

As shown in FIGS. 6 and 7, the first pocket peripheral surface 32 may be a front end surface 36 of the tool body 22.

In some embodiments of the present invention, the first pocket peripheral surface 32 may be substantially planar.

Also in some embodiments of the present invention, the first pocket peripheral surface 32 may be perpendicular to the axis of rotation $A_R$.

Figure 11:
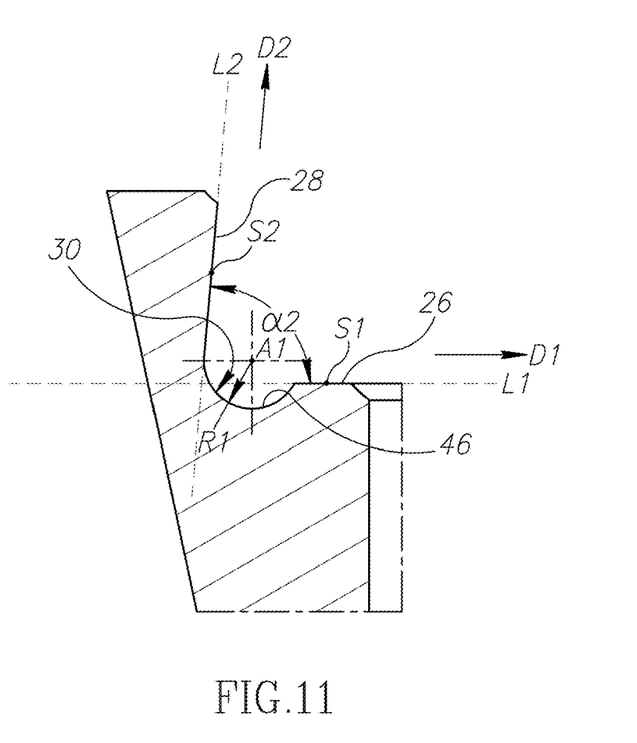
FIG. 11 is a detailed cross-sectional view of the insert receiving pocket shown in FIG. 9, taken along the lines XI-XI.

As shown in FIG. 11, the first stress relief surface 30 may have a concave shape in a cross-sectional view taken in a first plane P1 perpendicular to the first axis A1.

Also as shown in FIG. 11, in the cross-sectional view taken in the first plane P1, the first stress relief surface 30 may be arc-shaped, having a constant first relief surface radius R1 and an angular extent of greater than 90 degrees.

In some embodiments of the present invention, the first plane P1 may intersect the bottom support surface 26 and the abutment surface 28.

Also in some embodiments of the present invention, the support surface 26 may intersect a second pocket peripheral surface 38.

Further in some embodiments of the present invention, the support surface 26 may be planar.

As shown in FIG. 6, the second pocket peripheral surface 38 may be a cylindrical outer surface 40 of the tool body 22.

Figure 12:
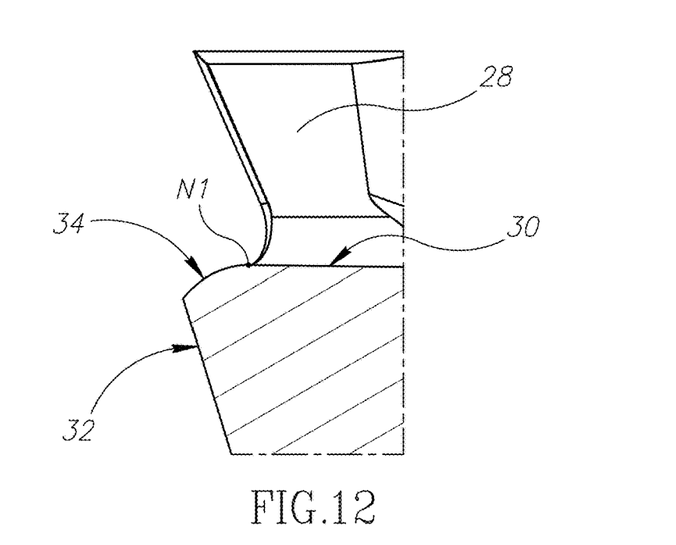
FIG. 12 is a detailed cross-sectional view of the insert receiving pocket shown in FIG. 9, taken along the lines XII-XII.

According to the present invention, as shown in FIG. 12, the second stress relief surface 34 has a convex shape in a cross-sectional view taken in a second plane P2 containing the first axis A1.

In some embodiments of the present invention, the second stress relief surface 34 may be non-honed, i.e., not formed by edge honing. Edge honing is an abrasive machining process in which material is removed from the edge of a cutting tool to achieve a rounded shape having a radius of between 0.01 mm to 0.20 mm, examples of which include, vibratory honing, media honing and brush honing.

Figure 10:
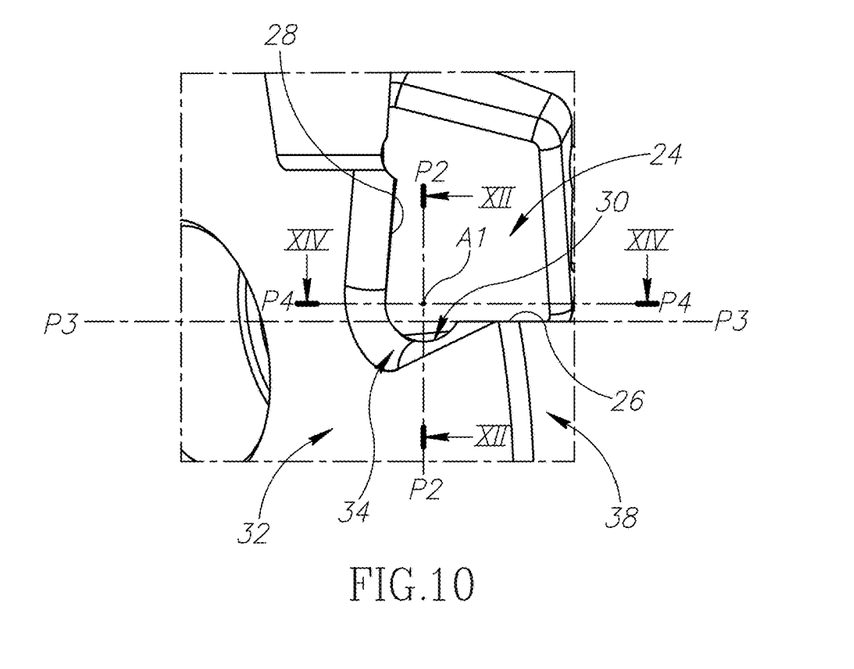
FIG. 10 is a side view of the insert receiving pocket shown in FIG. 7.

Also in some embodiments of the present invention, as shown in FIG. 10, the support surface 26 may define a third plane P3, and the third plane P3 may be perpendicular to the second plane P2.

Figure 13:
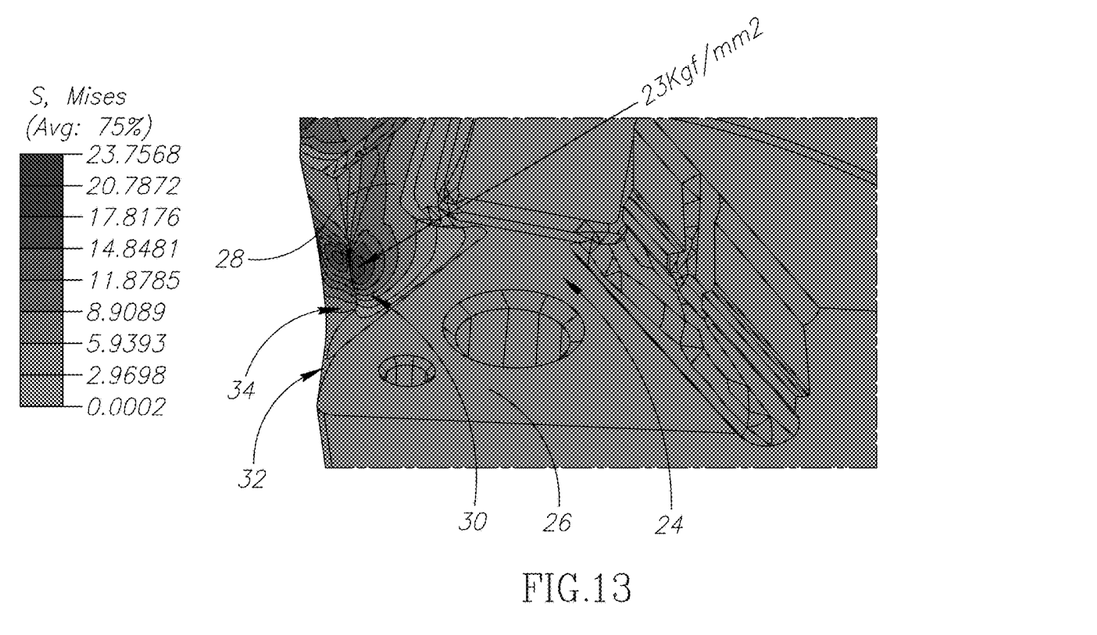
FIG. 13 is a finite element analysis diagram of the insert receiving pocket shown in FIG. 7.

FIG. 13 is a detailed FEA diagram showing the tensile stresses exerted on the pocket 24 of the present invention, via its associated cutting insert (not shown), during cutting operations, with a peak tensile stress value of 23 Kgf/mm$^2$ occurring at the second stress relief surface 34.

The peak tensile stress value of 23 Kgf/mm$^2$ occurring at the second stress relief surface 34 of the present invention, shown in FIG. 13, is significantly lower that the peak tensile stress value of 37 Kgf/mm2 occurring immediately adjacent the corner intersection surface 134 of the prior art example insert receiving pocket 124, shown in FIG. 5.

The provision of the second stress relief surface 34 having a convex cross-sectional shape ensures a smooth transition with the adjoining surfaces, namely, the first stress relief surface 30 and the first pocket peripheral surface 32, advantageously reducing the peak tensile stress values exerted on the pocket 24.

Figure 14:
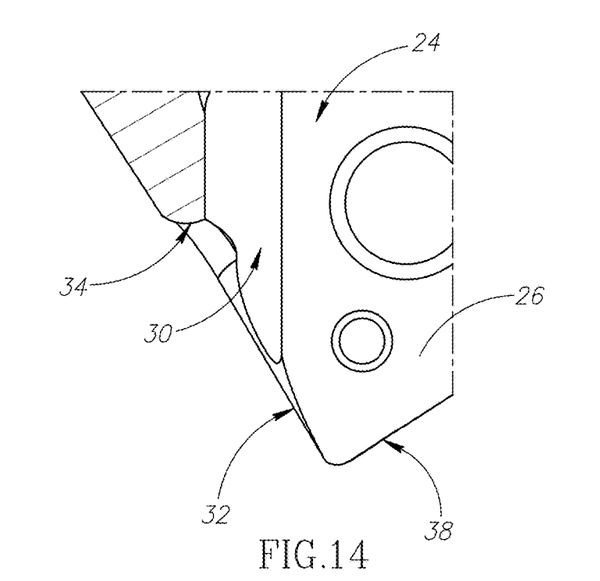
FIG. 14 is a detailed cross-sectional view of the insert receiving pocket shown in FIG. 10, taken along the lines XIV-XIV.

In some embodiments of the present invention, as shown in FIG. 14, the second stress relief surface 34 may have a convex shape in a cross-sectional view taken in a fourth plane P4 containing the first axis A1 and perpendicular to the second plane P2.

Also in some embodiments of the present invention, the second stress relief surface 34 may have a convex shape in cross-sectional views (not shown) taken along its course between the second and fourth planes P2, P4.

Figure 15:
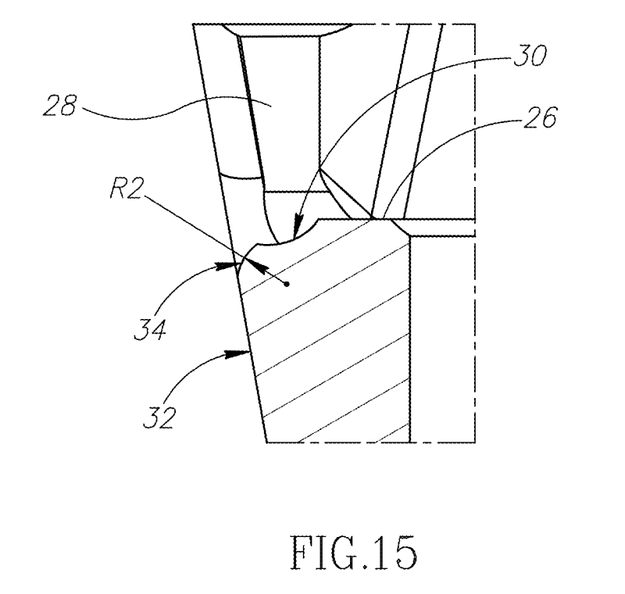
FIG. 15 is a detailed cross-sectional view of the insert receiving pocket shown in FIG. 9, taken along the lines XV-XV.

As shown in FIG. 15, in a cross-sectional view taken in a fifth plane P5 perpendicular to the first pocket peripheral surface 32, the second stress relief surface 34 may have a second relief surface radius R2.

In some embodiments of the present invention, the second relief surface radius R2 may be greater than 0.3 mm.

Also in some embodiments of the present invention, the second relief surface radius R2 may be equal to or less than the first relief surface radius R1.

Further in some embodiments of the present invention, the fifth plane P5 may intersect the second plane P2 to form an acute first pocket angle $\alpha 1$ having a value of less than or equal to 60 degrees.

The present invention also relates to a method of manufacturing the tool holder 20, where the second stress relief surface 34 may be formed by a non-abrasive machining process, and therefore differs from edge honing.

In some embodiments of the present invention, the second stress relief surface 34 may be machined using a rotary cutting tool 42, e.g. a milling cutter.

Figure 16:
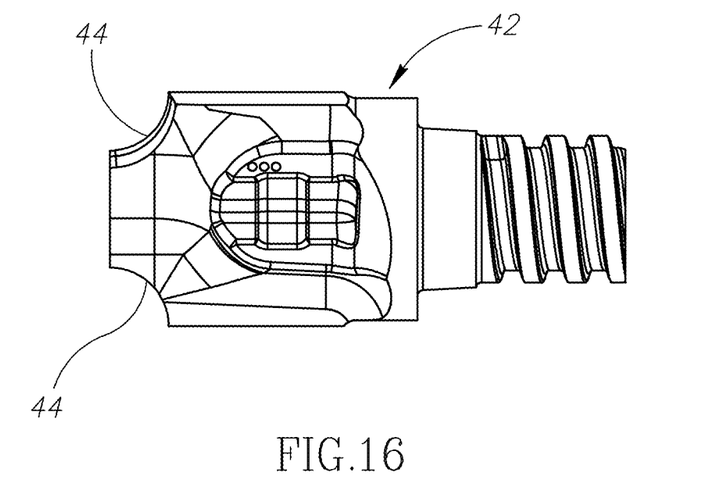
FIG. 16 is a side view of a rotary cutting tool used in the manufacture of the tool holder of the present invention.

As shown in FIG. 16, the rotary cutting tool 42 may have an outwardly concave shaped cutting edge 44, in a side view thereof.

In some embodiments of the present invention, the concave cutting edge 44 of the rotary cutting tool 42 may have a radius greater than 0.3 mm, in a side view thereof.

As shown in FIG. 12, in the cross-sectional view taken in the second plane P2, the first stress relief surface 30 may be tangential to the second stress relief surface 34 at a first end point N1 of the second stress relief surface 34.

Configuring the first stress relief surface 30 to be tangential to the second stress relief surface 34 ensures a smooth transition (e.g., devoid of a discontinuity) between these surfaces, thus resulting in improved stress reduction.

In other embodiments of the present invention (not shown), the second and fifth planes P2, P5 may be coplanar, and the first pocket peripheral surface 32 may be tangential to the second stress relief surface 34 at a second end point of the second stress relief surface 34.

As shown in FIG. 11, in the cross-sectional view taken in the first plane P1, first and second imaginary straight lines L1, L2 tangential to first and second surface points S1, S2 on the support surface 26 and the abutment surface 28, respectively, intersect each other to form a second pocket angle α2.

In some embodiments of the present invention, the second pocket angle α2 may have a value between 20 and 120 degrees.

Also in some embodiments of the present invention, a concave surface portion 46 of the first stress relief surface 30 may be undercut with respect to at least one of:

a first direction D1 parallel to the first imaginary straight line L1, and a second direction D2 parallel to the second imaginary straight line L2.

As shown in FIG. 11, the concave surface portion 46 is undercut with respect to the first direction D1.

It should be appreciated that use of the term "undercut" throughout the description and claims refers to a recess or passage, where a straight line extending in a certain direction away from a given sub-surface of the recess or passage intersects another sub-surface of the same recess or passage.

Although the present invention has been described to a certain degree of particularity, it should be understood that various alterations and modifications could be made without departing from the spirit or scope of the invention as hereinafter claimed.

What is claimed is:

1. A tool holder (20) comprising:
   a tool body (22) having at least one pocket (24) for receiving at least one cutting insert, the at least one pocket (24) comprising a support surface (26) and an abutment surface (28) transverse thereto, and
   a first stress relief surface (30) located between the support surface (26) and the abutment surface (28), the first stress relief surface (30) extending along a first axis (A1) towards a first pocket peripheral surface (32),
   wherein a second stress relief surface (34) is formed between the first stress relief surface (30) and the first pocket peripheral surface (32), and
   wherein the second stress relief surface (34) has a convex shape in a cross-sectional view taken in a second plane (P2) containing the first axis (A1).

2. The tool holder (20) according to claim 1, wherein:
   in a cross-sectional view taken in a fifth plane (P5) perpendicular to the first pocket peripheral surface (32), the second stress relief surface (34) has a second relief surface radius (R2), and
   the second relief surface radius (R2) is greater than 0.3 mm.

3. The tool holder (20) according to claim 1, wherein: the second stress relief surface (34) is non-honed.

4. The tool holder (20) according to claim 1, wherein: the first stress relief surface (30) intersects the support surface (26) and the abutment surface (28).

5. The tool holder (20) according to claim 1, wherein: the tool body (22) has an axis of rotation ($A_R$), and the first pocket peripheral surface (32) is substantially planar, and perpendicular to the axis of rotation ($A_R$).

6. The tool holder (20) according to claim 1, wherein: the support surface (26) and the abutment surface (28) intersect the first pocket peripheral surface (32).

7. The tool holder (20) according to claim 1, wherein: the abutment surface (28) is planar, and the first axis (A1) is parallel to the abutment surface (28).

8. The tool holder (20) according to claim 1, wherein:
   in the cross-sectional view taken in the second plane (P2), the first stress relief surface (30) is tangential to the second stress relief surface (34) at a first end point (N1) of the second stress relief surface (34).

9. The tool holder (20) according to claim 1, wherein:
   the second stress relief surface (34) has a convex shape in a cross-sectional view taken in a fourth plane (P4) containing the first axis (A1) and perpendicular to the second plane (P2).

10. The tool holder (20) according to claim 1, wherein:
    the support surface (26) defines a third plane (P3), and the third plane (P3) is perpendicular to the second plane (P2).

11. The tool holder (20) according to claim 1, wherein:
    the first stress relief surface (30) has a concave shape in a cross-sectional view taken in a first plane (P1) perpendicular to the first axis (A1).

12. The tool holder (20) according to claim 11, wherein:
    the first plane (P1) intersects the support surface (26) and the abutment surface (28).

13. The tool holder (20) according to claim 11, wherein:
    in the cross-sectional view taken in the first plane (P1), the first stress relief surface (30) is arc-shaped, having a constant first relief surface radius (R1) and an angular extent of greater than 90 degrees.

14. The tool holder (20) according to claim 13, wherein:
    in a cross-sectional view taken in a fifth plane (P5) perpendicular to the first pocket peripheral surface (32), the second stress relief surface (34) has a second relief surface radius (R2), and
    the second relief surface radius (R2) is equal to or less than the first relief surface radius (R1).

15. The tool holder (20) according to claim 11, wherein:
    in the cross-sectional view taken in the first plane (P1), first and second imaginary straight lines (L1, L2) tangential to first and second surface points (S1, S2) on the support surface (26) and the abutment surface (28), respectively, intersect each other to form a second pocket angle (α2), and
    the second pocket angle (α2) has a value between 20 and 120 degrees.

16. The tool holder (20) according to claim 15, wherein a concave surface portion (46) of the first stress relief surface (30) is undercut with respect to at least one of:
    a first direction (D1) parallel to the first imaginary straight line (L1), and
    a second direction (D2) parallel to the second imaginary straight line (L2).

17. A method of manufacturing the tool holder (20) of claim 1, comprising:
    formation of the second stress relief surface (34) by non-abrasive machining.

18. The method according to claim 17, comprising:
    machining the second stress relief surface (34) using a rotary cutting tool (42).

19. The method according to claim 18, wherein:
    the rotary cutting tool (42) has an outwardly concave shaped cutting edge (44), in a side view thereof.

20. The method according to claim 18, wherein:
    the rotary cutting tool (42) has an outwardly concave shaped cutting edge (44) with a radius greater than 0.3 mm, in a side view thereof.

* * * * *